US012584553B2

(12) United States Patent
Nakano et al.

(10) Patent No.: US 12,584,553 B2
(45) Date of Patent: Mar. 24, 2026

(54) OIL PASSAGE STRUCTURE FOR AUTOMATIC TRANSMISSION

(71) Applicant: Mazda Motor Corporation, Hiroshima (JP)

(72) Inventors: Atsushi Nakano, Aki-gun (JP); Yukio Sakata, Aki-gun (JP); Kota Morino, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/064,934

(22) Filed: Feb. 27, 2025

(65) Prior Publication Data

US 2025/0305573 A1 Oct. 2, 2025

(30) Foreign Application Priority Data

Mar. 27, 2024 (JP) ................................. 2024-050897

(51) Int. Cl.
| | |
|---|---|
| *F16H 57/04* | (2010.01) |
| *B60K 6/26* | (2007.10) |
| *B60K 6/54* | (2007.10) |
| *F16H 57/025* | (2012.01) |

(52) U.S. Cl.
CPC ........... *F16H 57/0424* (2013.01); *B60K 6/26* (2013.01); *B60K 6/54* (2013.01); *F16H 57/025* (2013.01); *F16H 57/0476* (2013.01)

(58) Field of Classification Search
CPC .............. F16H 57/0424; F16H 57/025; F16H 57/0476; F16H 57/031; F16H 2057/02008; F16H 2057/02034; B60K 6/26; B60K 6/54; Y02T 10/62
See application file for complete search history.

(56) References Cited

U.S. PATENT DOCUMENTS

| | | | |
|---|---|---|---|
| 8,360,186 B2 * | 1/2013 | Yamamoto | ........... B60K 7/0007 |
| | | | 74/606 A |
| 2013/0057117 A1 * | 3/2013 | Suzuki | ................. B60K 7/0007 |
| | | | 310/60 R |

FOREIGN PATENT DOCUMENTS

| | | | | |
|---|---|---|---|---|
| JP | S6084451 A | * | 5/1985 | .............. F16H 5/64 |
| JP | H0755401 Y2 | * | 12/1995 | ............. F16H 41/30 |
| JP | 2014-088906 A | | 5/2014 | |

* cited by examiner

*Primary Examiner* — Thomas C Diaz
(74) *Attorney, Agent, or Firm* — XSENSUS LLP

(57) ABSTRACT

An oil passage structure includes an oil passage constituted by a first groove formed in a first wall and a second groove formed in a second wall. The first wall has a first recess recessed toward one side in an axial direction. The second wall has a second recess that is located at a position different from the first recess in a radial direction of a main shaft and that is recessed toward another side in the axial direction. A portion of a first component is disposed in the first recess, a portion of a second component is disposed in the second recess, and, in the oil passage, a second passage located at a position corresponding to the second recess is located on the other side in the axial direction relative to a first passage located at a position corresponding to the first recess.

19 Claims, 9 Drawing Sheets

OUTER SIDE

REAR SIDE ←——→ FRONT SIDE

INNER SIDE

OUTER SIDE

REAR SIDE ←→ FRONT SIDE

INNER SIDE

261(260)

251(250)

20

252

253

256

265

71

245

246a(246)

14

241

242

265a

246b(246)

70

243

255

262(260)

OUTER SIDE

REAR SIDE ←→ FRONT SIDE

INNER SIDE

OIL PASSAGE STRUCTURE FOR AUTOMATIC TRANSMISSION

CROSS-REFERENCE TO RELATED APPLICATION

This application claims priority to Japanese Patent Application No. 2024-050897, filed on Mar. 27, 2024, which is incorporated herein by reference in its entirety.

TECHNICAL FIELD

The technology disclosed herein belongs to a technical field related to an oil passage structure for an automatic transmission.

BACKGROUND ART

Conventionally, an oil passage structure having an oil passage formed using the housing of an automatic transmission has been known.

In Patent Literature 1, on a transaxle cover attached to an opening of a transaxle case in which a vehicle power transmission device including a motor generator is accommodated, an oil supply passage is provided to take oil supplied by an oil pump to the outside of the transaxle case.

In Patent Literature 1, the oil supply passage extends in a radial direction of a main shaft of the transaxle (automatic transmission). Moreover, the oil supply passage is formed integrally with the transaxle cover by casting using a core.

CITATION LIST

Patent Literature

[Patent Literature 1] Japanese Patent Laid-Open No. 2014-88906

SUMMARY OF INVENTION

Problem to be Solved by the Invention

When an oil passage is formed by casting as in the oil passage structure described in Patent Literature 1, the oil passage has a tapered shape due to a draft angle of a core pin for casting. When the oil passage extends in the radial direction of the main shaft, the oil passage spreads in the axial direction of the main shaft, which leads to an increase in the size of the automatic transmission in the axial direction.

To limit an increase in the size of the automatic transmission in the axial direction, it is conceivable to construct the oil passage by machining the axially facing surfaces of members which constitute the automatic transmission. However, when constituent components of the automatic transmission are disposed near the facing surfaces, it is necessary to construct the oil passage having a required cross-sectional area of a channel while avoiding interference with the constituent components. When the constituent components are spaced apart from the oil passage to avoid interference between the oil passage and the constituent components, the automatic transmission ends up in larger size in the axial direction.

The technology disclosed herein has been developed in consideration of the above point, and an object of this technology is to provide an oil passage structure that can limit an increase in the size of an automatic transmission.

Means for Solving the Problem

In order to solve the above problem, a first aspect of the technology disclosed herein is directed to an oil passage structure for an automatic transmission. The oil passage structure includes: a first member constituting a first wall extending in a radial direction of a main shaft of the automatic transmission; a second member constituting a second wall that extends in the radial direction, and is arranged to face the first wall from one side in an axial direction of the main shaft; and an oil passage constituted by a first groove formed on a surface of the first wall on the one side in the axial direction and extending in the radial direction, and a second groove formed on a surface of the second wall on the other side in the axial direction and extending in the radial direction, in which the first wall has a first recess on a surface on the other side in the axial direction, the first recess being recessed toward the one side in the axial direction, the second wall has a second recess on a surface on the one side in the axial direction, the second recess being recessed toward the other side in the axial direction, at least a portion of a first component is disposed in the first recess, at least a portion of a second component is disposed in the second recess, and in the oil passage, a second passage located at a position corresponding to the second recess in the radial direction, the second passage is located on the other side in the axial direction relative to a first passage located at a position corresponding to the first recess in the radial direction.

In the first aspect, the first component can be disposed closer to the second passage while being spaced apart from the first passage in the axial direction. On the other hand, the second component can be disposed closer to the first passage while being spaced apart from the second passage in the axial direction. This makes it possible to reduce the size in the axial direction while avoiding interference between the first component, the second component, and the oil passage. Therefore, it is possible to limit an increase in the size of the automatic transmission.

According to a second aspect, in the first aspect, the depth of the first groove is shallower in the first passage than in the second passage, and the depth of the second groove is shallower in the second passage than in the first passage.

In the second aspect, by making the first groove shallower in the first passage corresponding to the position of a first protruding portion, and by making the second groove shallower in the second passage corresponding to the position of a second protruding portion, it is possible to form the oil passage into a shape matching the first recess and the second recess while ensuring the cross-sectional area of a channel of the oil passage. Consequently, it is possible to limit an increase in the size of the automatic transmission.

According to a third aspect, in the first aspect, the first passage is constituted by only the second groove out of the first groove and the second groove, and the second passage is constituted by only the first groove out of the first groove and the second groove.

In the third aspect, the first recess and the second recess can be made as deep as possible. Consequently, the first component can be placed as close as possible to the one side in the axial direction, and the second component can be placed as close as possible to the other side in the axial direction. Therefore, it is possible to limit an increase in the size of the automatic transmission.

According to a fourth aspect, in the first to third aspects, the first member is a motor housing that accommodates a motor, the first component is a rotation angle sensor, the motor is located on the other side in the axial direction relative to the first component, and a coil is located near the first component.

In the fourth aspect, since the coil of the motor is located near the first component, the motor and the first component need to be spaced apart from each other in the axial direction or the radial direction. The first component can be spaced apart from the motor in the axial direction as far as possible by disposing the first component in the first recess. Therefore, it is possible to limit an increase in the size of the automatic transmission.

According to a fifth aspect, in the fourth aspect, a torque converter is disposed on the radial-direction inner side relative to the motor, the first recess is located on the radial-direction outer side relative to the second recess, and the first component measures the rotation angle of the torque converter and is located on the radial-direction outer side relative to the second component.

In the fifth aspect, since the torque converter is located on the radial-direction inner side of the motor, it is necessary to dispose the first component side by side with the torque converter in the axial direction. Since the first recess is located on the radial-direction outer side relative to the second recess, the first component can be disposed as far outward as possible in the radial direction. Consequently, it is possible to dispose the torque converter and the first component side by side in the axial direction in a state in which the torque converter and the first component are placed closer to each other in the axial direction. Therefore, it is possible to limit an increase in the size of the automatic transmission.

According to a sixth aspect, in any one of the first to third aspects, the second component is a bolt, and at least a portion of a bolt head of the second component is disposed in the second recess.

In the sixth aspect, the protruding amount of the bolt head from the second wall toward the one side in the axial direction can be limited as much as possible. Consequently, it is possible to limit an increase in the size of the automatic transmission.

According to a seventh aspect, in the sixth aspect, a third recess is located at the position of the bolt in the second recess, the third recess being recessed further toward the other side in the axial direction than the other portion of the second recess, and the bolt head is disposed in the third recess.

In the seventh aspect, the protruding amount of the bolt head from the second wall toward the one side in the axial direction can be limited as much as possible. Consequently, it is possible to limit an increase in the size of the automatic transmission.

According to an eighth aspect, in the seventh aspect, a transmission mechanism is provided at a position that is on the one side in the axial direction relative to the second wall and near the second recess.

In the eighth aspect, since the protruding amount of the bolt head is limited, the transmission mechanism can be placed as close as possible to the other side in the axial direction. Consequently, it is possible to limit an increase in the size of the automatic transmission.

Advantageous Effects of Invention

As described above, according to the technology disclosed herein, it is possible to limit an increase in the size of the automatic transmission.

MODE FOR CARRYING OUT THE INVENTION

Hereinafter, exemplary embodiments will be described in detail with reference to the drawings.

Embodiment 1

(1) Entire Configuration of Automatic Transmission

Figure 1:
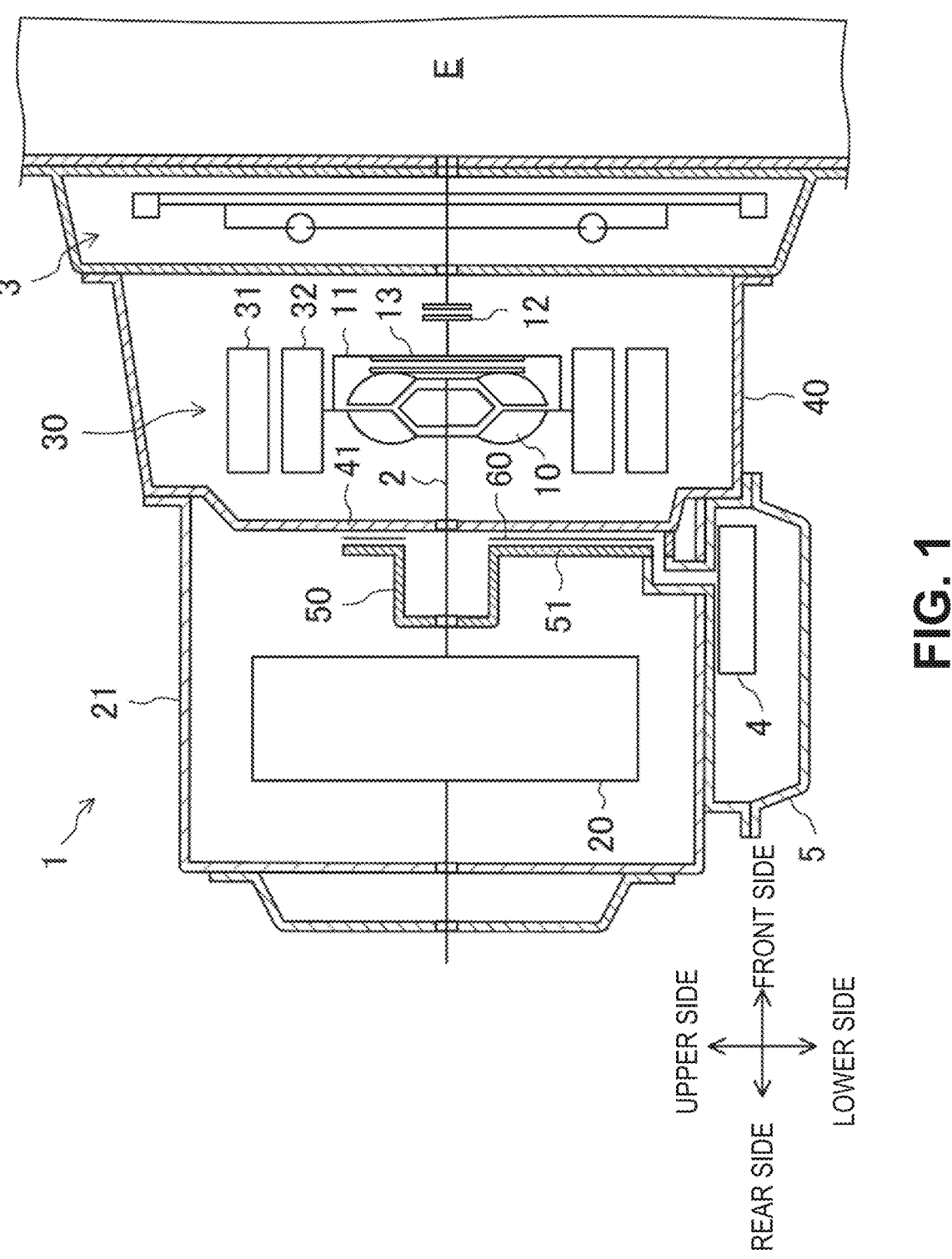
FIG. 1 is a skeleton diagram of an automatic transmission having an oil passage structure according to exemplary Embodiment 1.

FIG. 1 shows an automatic transmission 1 having an oil passage structure according to Embodiment 1. The automatic transmission 1 is an automatic transmission that is mounted on a vehicle. The vehicle is a hybrid vehicle having an engine E and a motor 30. The automatic transmission 1 changes the speed of rotation transmitted from the engine E or rotation of the motor 30, and outputs the rotation. Note that, in the description below, the term "axial direction" refers to a direction in which a main shaft 2 of the automatic transmission 1 extends, the term "radial direction" refers to a direction orthogonal to the direction in which the main shaft 2 extends, and the term "circumferential direction" refers to the circumferential direction of the main shaft 2. Furthermore, in the axial direction, the engine E-side is referred to as the axial-direction front side, and the opposite side to the engine E is referred to as the axial-direction rear side. The axial-direction front side and the axial-direction rear side mentioned here do not limit the actual layout of the automatic transmission 1.

The automatic transmission 1 includes a damper 3, a torque converter 10, and a transmission mechanism 20.

The damper 3 is disposed on the axial-direction rear side of the engine E. The damper 3 is connected to an output shaft of the engine E. The damper 3 reduces vibration caused by torque fluctuations of the engine.

The torque converter 10 is disposed on the axial-direction rear side of the damper 3, and is accommodated in a motor housing 40 in which the motor 30 is accommodated. In the motor housing 40, the motor 30 is configured such that a rotor 32 is disposed on the radial-direction inner side of a stator 31, and the torque converter 10 is located on the radial-direction inner side relative to the rotor 32. The motor housing 40 is made of aluminum or an aluminum alloy. The motor housing 40 is an example of a first member.

The torque converter 10 is connected through a transmission part 11 and a clutch 12 connected to the output shaft of the engine E. The transmission part 11 is also connected to the rotor 32 of the motor 30. When the clutch 12 is released, the output shaft of the engine E and the transmission part 11 are disconnected. On the other hand, when the clutch 12 is engaged, the engine E and the transmission part 11 are connected. The clutch 12 is engaged when the rotation of the engine E is transmitted to the transmission part 11. On the other hand, the clutch 12 is released, for example, when the vehicle is driven only by the rotation of the motor 30 without using the engine E, or when regenerative charging is performed.

The torque converter 10 transmits power through a fluid. The torque converter 10 has a lock-up clutch 13. When the lock-up clutch 13 is released, the rotations of the engine E and the motor 30 are transmitted to the main shaft 2 through the fluid. When the lock-up clutch 13 is engaged, the rotations of the engine E and the motor 30 are transmitted from the transmission part 11 to the main shaft 2 without the fluid.

The transmission mechanism 20 changes the speed of the output transmitted from the main shaft 2. The transmission mechanism 20 is accommodated in a transmission case 21 disposed on the axial-direction rear side of the motor housing 40. The transmission case 21 is fixed to the motor housing 40. The transmission mechanism 20 is configured to be able to form a plurality of gear stages having a different transmission gear ratio by a combination of a plurality of gears having different numbers of teeth. The gear stages are switched by hydraulic control.

A cover 50 attached to the motor housing 40 is disposed in the transmission case 21. The cover 50 is attached to a first wall 41 that is provided on the axial-direction rear side of the motor housing 40 and extends in the radial direction. The cover 50 includes a second wall 51 that extends in the radial direction and is arranged to face the first wall 41 from the axial-direction rear side. The cover 50 is made of iron. As will be described in detail later, the first wall 41 and the second wall 51 form an oil passage 60 through which oil flows. The cover 50 is an example of a second member.

(2) Oil Passage Structure

As shown in FIG. 1, a valve body 4 for supplying the oil to the clutch 12, the lock-up clutch 13, the transmission mechanism 20, etc. is fixed to a lower portion of the transmission case 21. The valve body 4 is accommodated in an oil pan 5 in which the oil is stored. The oil is pumped up by an oil pump (not shown), and supplied to the respective locations through the valve body 4.

The automatic transmission 1 includes the oil passage 60 for circulating the oil from the valve body 4 toward the radial-direction inner side. The oil passage 60 is constituted by a first groove 46 formed in the first wall 41, and a second groove 56 formed in the second wall 51. In order to describe the configuration of the oil passage 60, the first wall 41 and the second wall 51 will be described in detail below with reference to FIGS. 2 to 6. Note that, in FIGS. 2 and 3, the up-down direction is inverted from that in FIG. 1.

(2-1) First Wall

Figure 2:
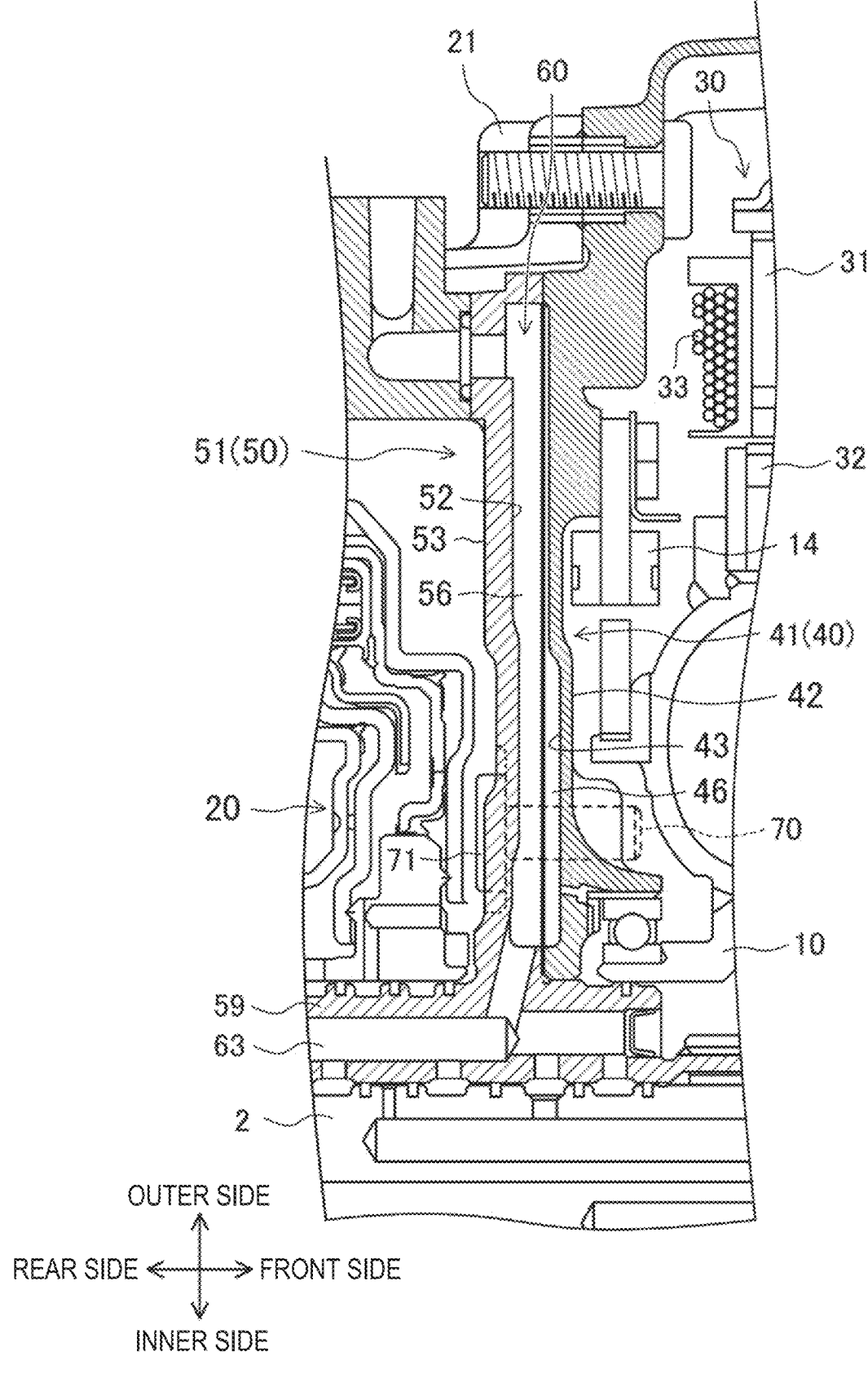
FIG. 2 is a cross-sectional view showing a portion of an oil passage.

As shown in FIG. 2, the first wall 41 includes a first front surface 42 which is a surface on the axial-direction front side, and a first rear surface 43 which is a surface on the axial-direction rear side.

A resolver 14 is attached to a portion on the radial-direction outer side of the first front surface 42. The resolver 14 is a rotation angle sensor that measures the rotation angle of the torque converter 10. The resolver 14 includes a measuring part 14a that measures the rotation angle, a mounting part 14b that is attached to the first front surface 42, and a rotating rotor 14c attached to the torque converter 10. The mounting part 14b extends from the measuring part 14a toward the radial-direction outer side, and an end portion on the radial-direction outer side is attached to the first front surface 42 with a bolt. The bolt is attached to the first wall 41 at a portion where the bolt does not interfere with the oil passage 60. The measuring part 14a protrudes from either side of the mounting part 14b in the axial direction. The position of an end portion of the measuring part 14a on the axial-direction front side overlaps with the position of an end portion of the torque converter 10 on the axial-direction rear side in the axial direction. The rotating rotor 14c is located on the axial-direction rear side relative to the torque converter 10. The measuring part 14a detects the position of the rotating rotor 14c, and whereby the resolver 14 measures the rotation angle of the torque converter 10. The resolver 14 is an example of a first component.

In the motor housing 40, the motor 30 is located on the axial-direction front side relative to the resolver 14. The position of an end portion of the resolver 14 on the radial-direction outer side overlaps with the position of the stator 31 of the motor 30 in the axial direction. A coil 33 wound around the stator 31 is located near the resolver 14.

Figure 3:
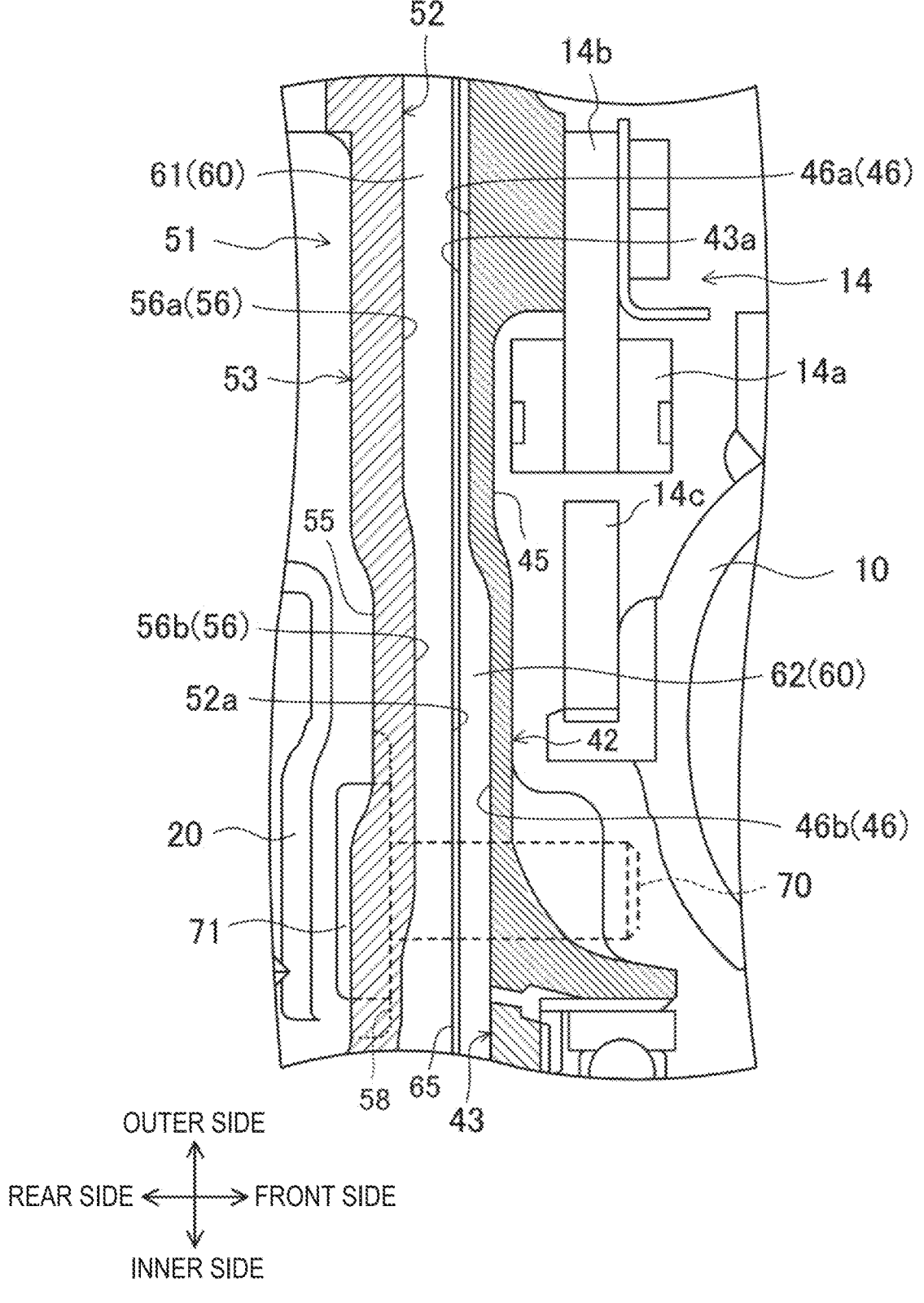
FIG. 3 is an enlarged cross-sectional view of the III region of FIG. 2.

As shown in FIG. 3, in the first front surface 42, a radial-direction outer side portion is located rearward in the axial direction relative to a radial-direction inner side portion. More specifically, the first front surface 42 has a first recess 45 that is provided at a position in the radial direction at which the resolver 14 is located, and that is recessed rearward in the axial direction. The position of a rear end surface 43a of the first rear surface 43 is the same in the portion where the first recess 45 is provided and other portions.

A portion of the measuring part 14a of the resolver 14 is disposed in the first recess 45. By providing the first recess 45, the resolver 14 can be spaced apart from the coil 33 of the motor 30 in the axial direction.

The first groove 46 is formed in the first rear surface 43. The first groove 46 extends in the radial direction. The depth direction of the first groove 46 coincides with the axial direction.

The first groove 46 includes a first outer groove 46a located relatively outward in the radial direction, and a first inner groove 46b located relatively inward in the radial direction. The position of the first outer groove 46a corresponds to the position in the radial direction at which the first recess 45 is provided. The bottom of the first outer groove 46a is located on the axial-direction rear side relative to the bottom of the first inner groove 46b. Therefore, the first outer groove 46a is shallower than the first inner groove 46b. The difference between the depth of the first outer groove 46a and the depth of the first inner groove 46b is the same as the depth of the first recess 45.

Figure 4:
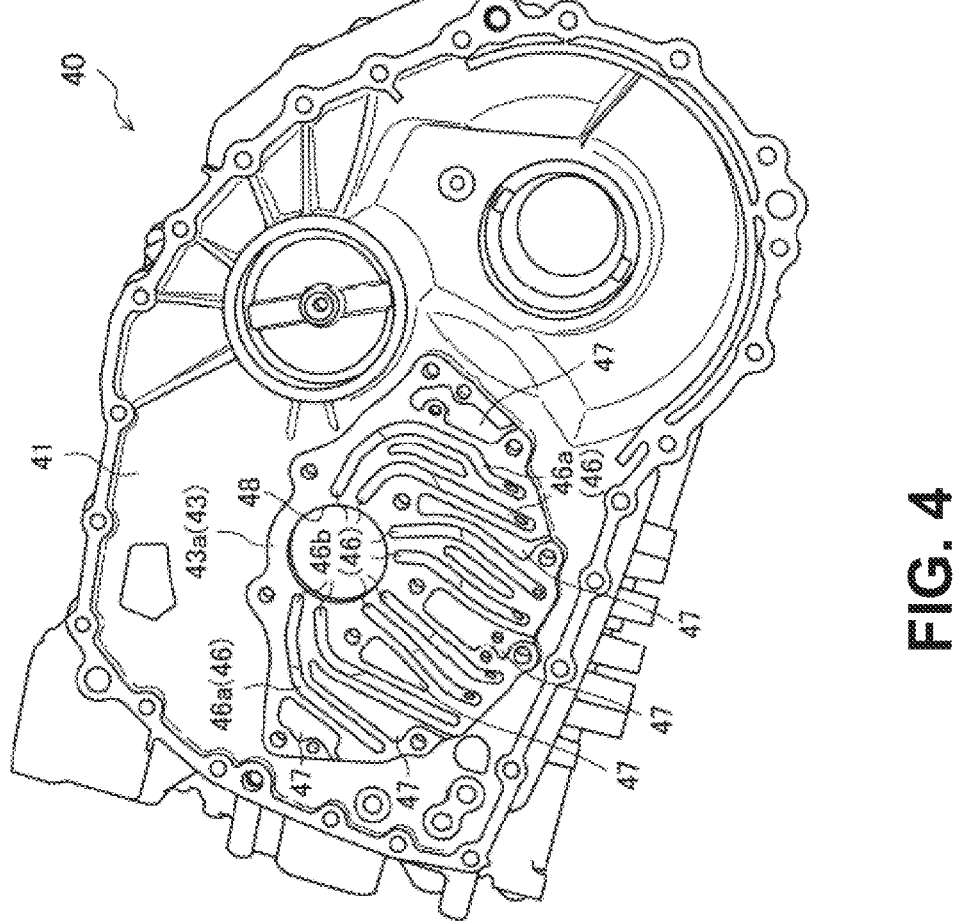
FIG. 4 is a perspective view showing a first rear surface of a first wall.

As shown in FIG. 4, a plurality of (eight in this example) first grooves 46 are provided. Each of the first grooves 46 has the same width. In each of the first grooves 46, the first outer groove 46a is shallower than the first inner groove 46b.

In the first rear surface 43, a plurality of first auxiliary grooves 47 are provided in addition to the first grooves 46. The first auxiliary groove 47 is a portion in which an auxiliary space for preventing communication between adjacent oil passages 60 is formed. The first auxiliary groove 47 is disposed, for example, between an oil passage leading to the clutch 12 and an oil passage leading to the transmission mechanism 20. The first auxiliary groove 47 communicates with the inner space of the motor housing 40 through a hole or groove. The oil that has entered the space formed by the first auxiliary groove 47 is discharged through the hole or groove.

The first wall 41 has a through-hole 48 passing through the first wall 41. The through-hole 48 is a hole through which the main shaft 2 and a later-described cylindrical part 59 of the cover 50 pass.

(2-2) Second Wall

As shown in FIG. 2, the second wall 51 includes a second front surface 52 which is a surface on the front side in the axial direction, and a second rear surface 53 which is a surface on the rear side in the axial direction.

The second wall 51 is connected to the first wall 41 with a bolt 70. The axial direction of the bolt 70 coincides with the axial direction of the main shaft 2. The bolt 70 is positioned so as not to overlap with the resolver 14 in the radial direction, more specifically is positioned inward in the radial direction relative to the resolver 14. The bolt 70 is fastened to the first wall 41 and the second wall 51 at a portion where the bolt 70 does not interfere with the oil passage 60. A bolt head 71 of the bolt 70 is located on the axial-direction rear side of the second wall 51. The bolt 70 is an example of a second component.

As shown in FIG. 3, in the second rear surface 53, a radial-direction inner side portion is located forward in the axial direction relative to a radial-direction outer side portion. More specifically, the second rear surface 53 has, at a position different from the first recess 45 in the radial direction, a second recess 55 recessed forward in the axial direction. The second recess 55 is located on the radial-direction inner side relative to the first recess 45. The position of the second recess 55 overlaps with the position of the torque converter 10 in the radial direction. A portion of the bolt head 71 is located in a portion of the second recess 55 on the radial-direction inner side. The position of a front end surface 52a of the second front surface 52 is the same in the portion where the second recess 55 is provided and other portions.

A third recess 58, which is recessed further forward in the axial direction than the other portion of the second recess 55, is located at the position of the bolt 70 in the second recess 55. The bolt head 71 is disposed in the third recess 58. The bolt head 71 protrudes rearward in the axial direction from the bottom of the third recess 58. An end surface of the bolt head 71 on the axial-direction rear side is located slightly rearward in the axial direction from the second rear surface 53. The third recess 58 is deeper than the first recess 45. The portion of the second recess 55, except for the third recess 58, has the same depth as the first recess 45.

Figure 5:
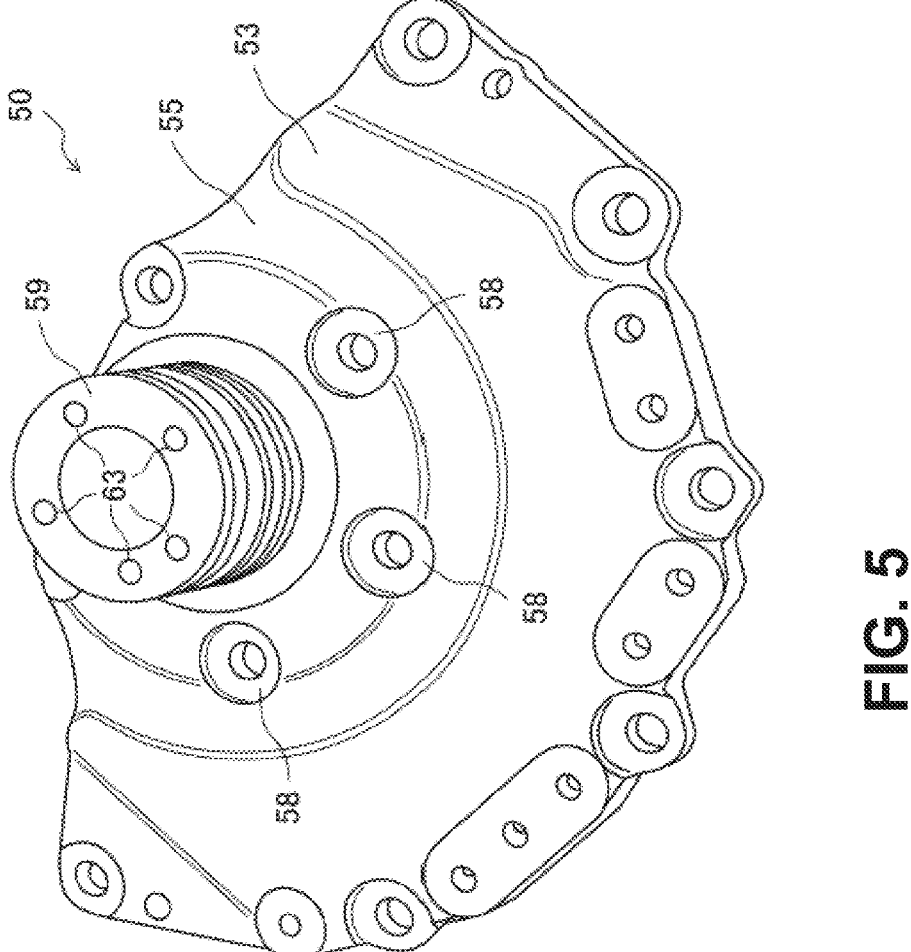
FIG. 5 is a perspective view showing a second rear surface of a second wall.

As shown in FIG. 5, the second recess 55 extends in the circumferential direction. The second recess 55 has the third recess 58 only at the position of the bolt 70.

As shown in FIG. 3, the transmission mechanism 20 is disposed at a position that is on the axial-direction rear side of the second wall 51, and near the second recess 55. A portion of the transmission mechanism 20 protrudes radially outward relative to the bolt head 71 in the second recess 55.

The second groove 56 is formed in the second front surface 52. The second groove 56 extends in the radial direction. The second groove 56 is disposed at a position corresponding to the first groove 46 in the circumferential direction. The depth direction of the second groove 56 coincides with the axial direction.

The second groove 56 includes a second outer groove 56a located relatively outward in the radial direction, and a second inner groove 56b located relatively inward in the radial direction. The position of the second inner groove 56b corresponds to the position at which the second recess 55 is provided in the radial direction. The bottom of the second inner groove 56b is located forward in the axial direction relative to the bottom of the second outer groove 56a. Therefore, the second inner groove 56b is shallower than the second outer groove 56a. The difference between the depth of the second outer groove 56a and the depth of the second inner groove 56b is the same as the depth of the second recess 55. Consequently, the difference between the depth of the second outer groove 56a and the depth of the second inner groove 56b is the same as the difference between the depth of the first outer groove 46a and the depth of the first inner groove 46b. The width of the second groove 56 is the same as the width of the first groove 46. The minimum value of the depth of the second inner groove 56b is larger than the maximum value of the depth of the first inner groove 46b.

Figure 6:
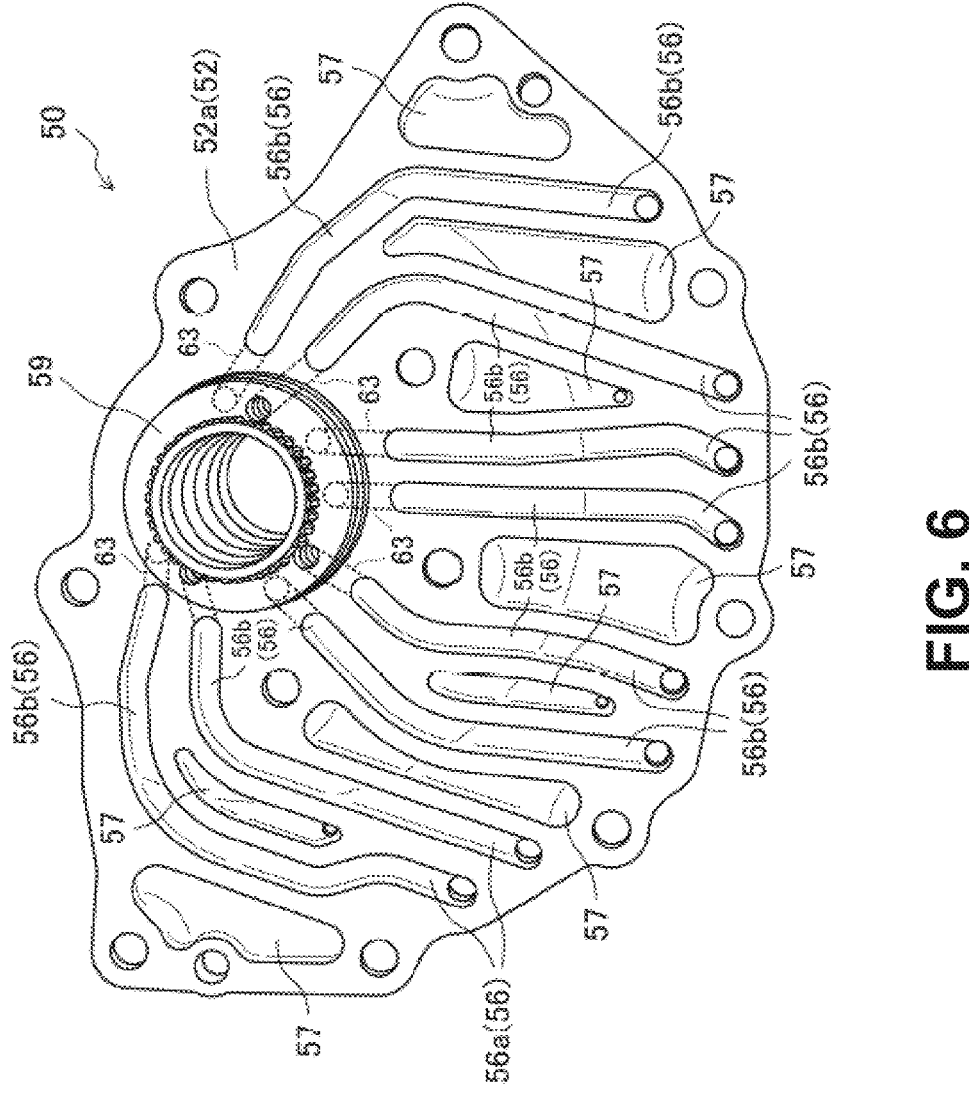
FIG. 6 is a perspective view showing a second front surface of the second wall.

As shown in FIG. 6, a plurality of (eight in this example) second grooves 56 are provided corresponding to the first grooves 46. Each of the second grooves 56 has the same width. In each of the second grooves 56, the second inner groove 56b is shallower than the second outer groove 56a.

In the second front surface 52, a plurality of second auxiliary grooves 57 are provided in addition to the second grooves 56. The second auxiliary groove 57 is located at a position corresponding to the position of the first auxiliary groove 47. The second auxiliary groove 57 is a portion that forms the auxiliary space in cooperation with the first auxiliary groove 47. The second auxiliary groove 57 is deeper than the first auxiliary groove 47.

(2-3) Oil Passage

As shown in FIG. 3, the oil passage 60 is formed by arranging the first groove 46 and the second groove 56 to face each other in the axial direction. A gasket 65 formed with a hole having a shape corresponding to the first groove 46 and the second groove 56 is disposed between the first rear surface 43 and the second front surface 52. As described above, since the plurality of first grooves 46 and the plurality of second grooves 56 are provided, a plurality of oil passages 60 are also provided. An operating oil for the clutch 12, an operating oil for the lock-up clutch 13, an operating oil for the transmission mechanism 20, and a lubricating oil independently pass through the plurality of oil passages 60, respectively.

The oil passage 60 includes a first passage 61 and a second passage 62. The first passage 61 is constituted by the first outer groove 46a and the second outer groove 56a. The second passage 62 is constituted by the first inner groove 46b and the second inner groove 56b. Therefore, the second passage 62 is located on the radial-direction inner side relative to the first passage 61. Moreover, the depth of the first groove 46 is shallower in the first passage 61 than in the second passage 62, and the depth of the second groove 56 is shallower in the second passage 62 than in the first passage 61. Since the difference between the depth of the first outer groove 46a and the depth of the first inner groove 46b is the same as the difference between the depth of the second outer groove 56a and the depth of the second inner groove 56b, and since the width of the first groove 46 and the width of the second groove 56 are the same, the cross-sectional area of the channel of the first passage 61 is equal in size to the cross-sectional area of the channel of the second passage 62. The second passage 62 is located on the axial-direction front side relative to the first passage 61. More specifically, the central position of the second passage 62 in the axial direction is located on the axial-direction front side relative to the central position of the first passage 61 in the axial direction. Note that "the cross-sectional areas of the channels are equal in size" includes not only a case in which the cross-sectional areas of the channels are exactly equal, but also a case in which the cross-sectional areas of the channels differ to such an extent that the cross-sectional areas can be considered to be substantially equal in size.

The cover 50 has, in the radial-direction inner side portion of the second wall 51, a cylindrical part 59 extending from the second wall 51 toward both sides in the axial direction. The cylindrical part 59 is integrated with the second wall 51. The main shaft 2 is provided through the cylindrical part 59. A communication passage 63 that communicates with the oil passage 60 is formed in the cylindrical part 59. The oil that has passed through the oil passage 60 is supplied to an oil passage formed in the main shaft 2 through the communication passage 63.

(3) Advantageous Effects of Embodiment 1

Here, when the oil passage 60 is formed by the first wall 41 of the motor housing 40 and the second wall 51 of the cover 50 as in Embodiment 1, interference between the resolver 14 and the bolt head 71 and the oil passage 60 becomes a problem. When the resolver 14 and the bolt head 71 are disposed spaced apart from the oil passage extending straight in the radial direction, the size of the automatic transmission 1 in the axial direction becomes larger.

In contrast, in the oil passage structure of the automatic transmission 1 according to Embodiment 1, the first recess 45 recessed rearward in the axial direction is provided in the first front surface 42 of the first wall 41, and the second recess 55 recessed forward in the axial direction is provided on the radial-direction inner side of the first recess 45 in the second rear surface 53 of the second wall 51. A portion of the resolver 14 in the radial direction is disposed in the first recess 45, and a portion of the bolt head 71 is disposed in the second recess 55. In the oil passage 60, the second passage 62 located at the position corresponding to the second recess 55 in the radial direction is located on the axial-direction front side relative to the first passage 61 located at the position corresponding to the first recess 45 in the radial direction. Therefore, the resolver 14 can be disposed closer to the second passage 62 while being spaced apart from the first passage 61 in the axial direction. On the other hand, the bolt head 71 can be disposed closer to the first passage 61 while being spaced apart from the second passage 62 in the axial direction. The oil passage structure enables a reduction in size in the axial direction while avoiding interference between the resolver 14 and the bolt head 71 and the oil passage 60, and can limit an increase in the size of the automatic transmission 1.

In particular, in Embodiment 1, the resolver 14 protrudes forward in the axial direction relative to the first wall 41, and the bolt head 71 protrudes rearward in the axial direction relative to the second wall 51. Since a portion of the resolver 14 is disposed in the first recess 45, the protruding amount of the resolver 14 toward the axial-direction front side is limited. Since a portion of the bolt head 71 is disposed in the second recess 55, the protruding amount of the bolt head 71 toward the axial-direction rear side is limited. Consequently, with this oil passage structure, since the components to be disposed around the resolver 14 and the bolt head 71 can be placed as close as possible to the oil passage 60, it is possible to limit an increase in the size of the automatic transmission 1.

In Embodiment 1, the depth of the first groove 46 is shallower in the first passage 61 than in the second passage 62, and the depth of the second groove 56 is shallower in the second passage 62 than in the first passage 61. Therefore, the oil passage structure allows the oil passage 60 to have a shape corresponding to the first recess 45 and the second recess 55 while ensuring the cross-sectional area of the channel of the oil passage 60. The oil passage structure can limit an increase in the size of the automatic transmission 1.

In particular, in Embodiment 1, the first passage 61 is constituted by the first outer groove 46a and the second outer groove 56a, the second passage 62 is constituted by the first inner groove 46b and the second inner groove 56b, and the difference between the depth of the first outer groove 46a and the depth of the first inner groove 46b is the same as the difference between the depth of the second outer groove 56a and the depth of the second inner groove 56b. Therefore, in this oil passage structure, it is possible to locate the second passage 62 forward in the axial direction relative to the first passage 61 while ensuring that the cross-sectional area of the channel of the second passage 62 is the same as the cross-sectional area of the channel of the first passage 61. The oil passage structure can limit an increase in the size of the automatic transmission 1 while forming the oil passage 60 having the channel with the appropriate cross-sectional area.

Moreover, in Embodiment 1, the minimum value of the depth of the second inner groove 56b is larger than the maximum value of the depth of the first inner groove 46b. Since the motor housing 40 is made of aluminum or an aluminum alloy, and the cover 50 is made of iron, the motor housing 40 has a lower rigidity compared to the cover 50. If the minimum value of the depth of the second inner groove 56b is larger than the maximum value of the depth of the first inner groove 46b, the first wall 41 can be made as thick as possible. Consequently, even when the oil passage 60 is constituted by the first groove 46 and the second groove 56, it is possible to make the rigidity of the first wall 41 as high as possible.

In Embodiment 1, the first wall 41 is a wall of the motor housing 40 that accommodates the motor 30, the motor 30 is located on the axial-direction front side relative to the resolver 14, and the coil 33 is located near the resolver 14. Since the coil 33 of the motor 30 is located near the resolver 14, the motor 30 and the resolver 14 need to be spaced apart from each other in the axial direction or the radial direction. By disposing the resolver 14 in the first recess 45, the resolver 14 can be spaced apart from the motor 30 in the axial direction as far as possible. Thus, the oil passage structure can limit an increase in the size of the automatic transmission 1 in the axial direction to ensure a distance between the motor 30 and the resolver 14.

In Embodiment 1, the torque converter 10 is disposed on the radial-direction inner side relative to the motor 30, the first recess 45 is located on the radial-direction outer side relative to the second recess 55, and the resolver 14 measures the rotation angle of the torque converter 10 and is located on the radial-direction outer side relative to the bolt 70. Since the torque converter 10 is located on the radial-direction inner side of the motor 30, the resolver 14 must be disposed side by side with the torque converter 10 in the axial direction. Since the first recess 45 is located on the radial-direction outer side relative to the second recess 55, the resolver 14 can be disposed as far outward as possible in the radial direction. Consequently, the torque converter 10 and the resolver 14 can be disposed side by side in the axial direction in a state in which the torque converter 10 and the resolver 14 are placed closer to each other in the axial direction. Therefore, the oil passage structure can limit an increase in the size of the automatic transmission 1.

In Embodiment 1, the bolt head 71 is disposed in the second recess 55. In particular, in Embodiment 1, the third recess 58, which is recessed further forward in the axial direction than the other portion of the second recess 55, is located at the position of the bolt 70 in the second recess 55, and the bolt head 71 is disposed in the third recess 58. Since the oil passage structure can limit the protruding amount of the bolt head 71 from the second wall 51 toward the axial-direction rear side as much as possible, it is possible to limit an increase in the size of the automatic transmission 1.

In Embodiment 1, the transmission mechanism 20 is disposed at a position that is on the axial-direction rear side relative to the second wall 51, and near the second recess 55. At the position near the second recess 55, since the second wall 51 is positioned forward in the axial direction, and since the protruding amount of the bolt head 71 is limited by the third recess 58, the transmission mechanism 20 can be located as far forward as possible in the axial direction. Consequently, the oil passage structure can limit an increase in the size of the automatic transmission 1.

In Embodiment 1, the second auxiliary groove 57 is deeper than the first auxiliary groove 47. Therefore, the first wall 41 can be made as thick as possible. In the oil passage structure, even when the oil passage 60 is constituted by the first auxiliary groove 47 and the second auxiliary groove 57, the rigidity of the first wall 41 can be enhanced as high as possible.

Embodiment 2

Hereinafter, Embodiment 2 will be described in detail with reference to the drawings. Note that, in the following description, the same parts as those in Embodiment 1 are labeled with the same reference signs, and detailed description thereof is omitted.

(4) Oil Passage Structure

Figure 7:
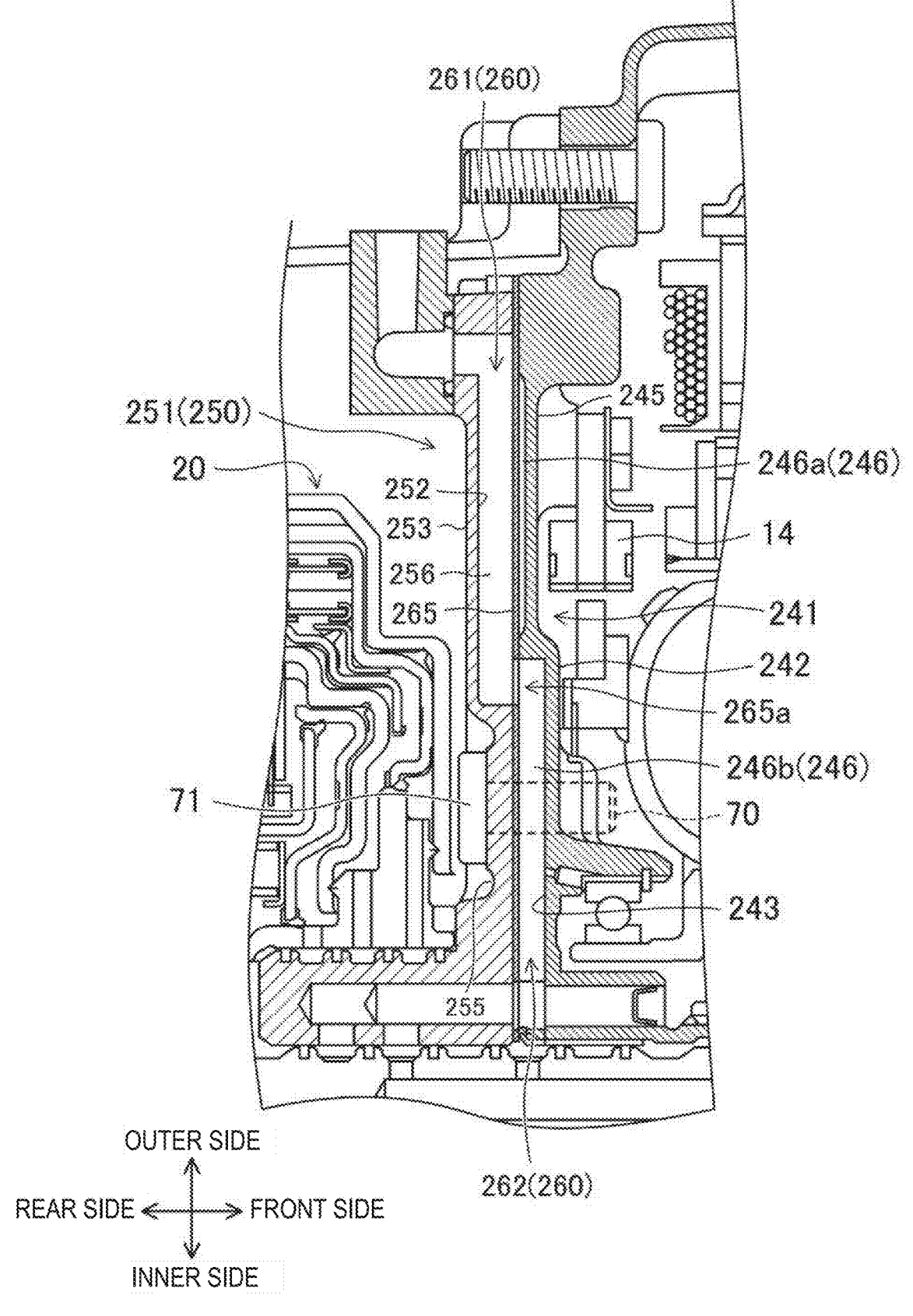
FIG. 7 is a cross-sectional view showing a portion of an oil passage in an automatic transmission having an oil passage structure according to Embodiment 2.
Figure 8:
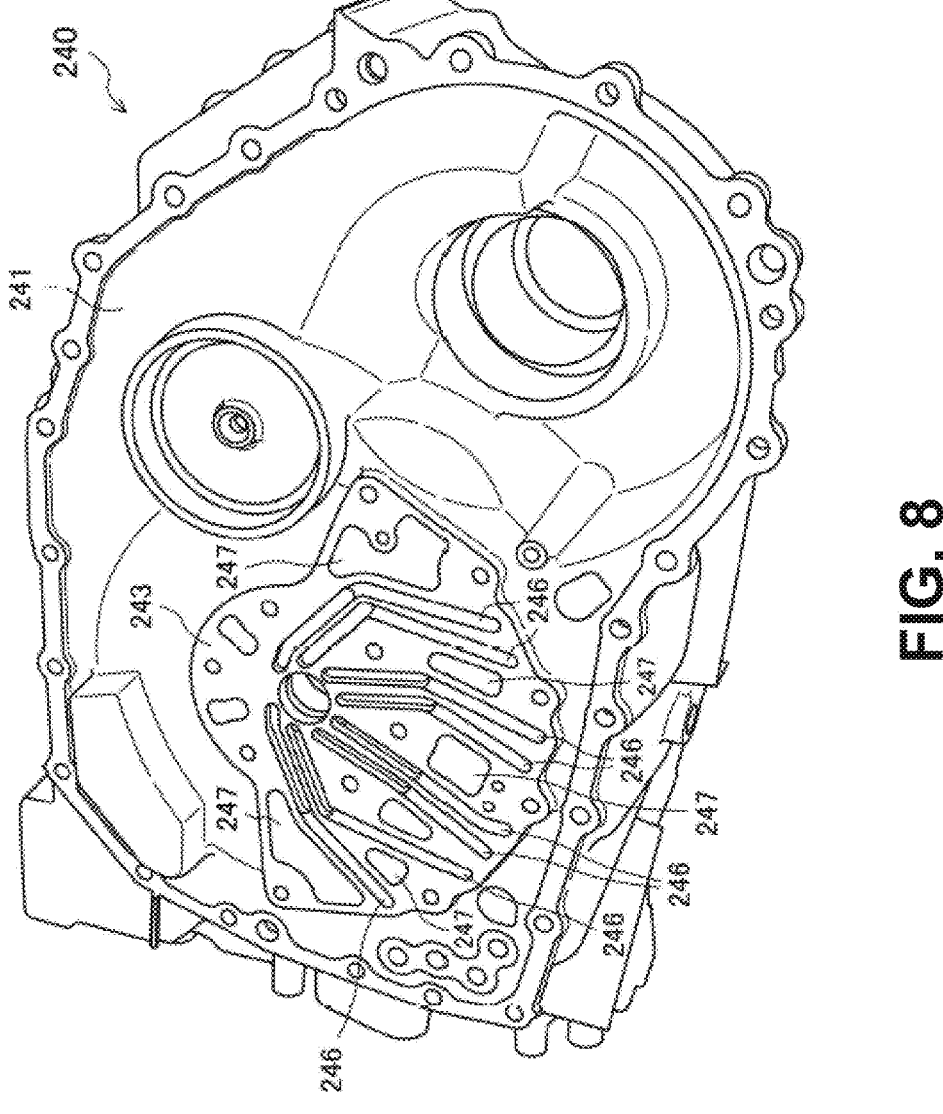
FIG. 8 is a perspective view showing an oil passage side of a motor housing according to Embodiment 2.

As shown in FIGS. 7 and 8, a first wall 241 is a wall on the axial-direction rear side of the motor housing 240. A first front surface 242 of the first wall 241 has a first recess 245 recessed rearward in the axial direction, at a position in the radial direction at which the resolver 14 is located. A portion of the resolver 14 is located in the first recess 245.

A first groove 246 is formed in the first rear surface 243. The first groove 246 extends in the radial direction. The depth direction of the first groove 246 coincides with the axial direction.

The first groove 246 includes a first outer groove 246a located relatively outward in the radial direction, and a first inner groove 246b located relatively inward in the radial direction. The position of the first outer groove 246a corresponds to the position in the radial direction at which the first recess 245 is provided. The first outer groove 246a is much shallower than the first inner groove 246b. As will be described in detail later, the first outer groove 246a does not constitute an oil passage 260, and only the first inner groove 246b constitutes the oil passage 260.

A plurality of (eight in this example) first grooves 246 are provided. Each of the first grooves 246 has the same width. In Embodiment 2, in the first rear surface 243, a plurality of first auxiliary grooves 247 are also provided in addition to the first grooves 246. The first auxiliary groove 247 is a portion in which an auxiliary space for preventing communication between adjacent oil passages 260 is formed.

Figure 9:
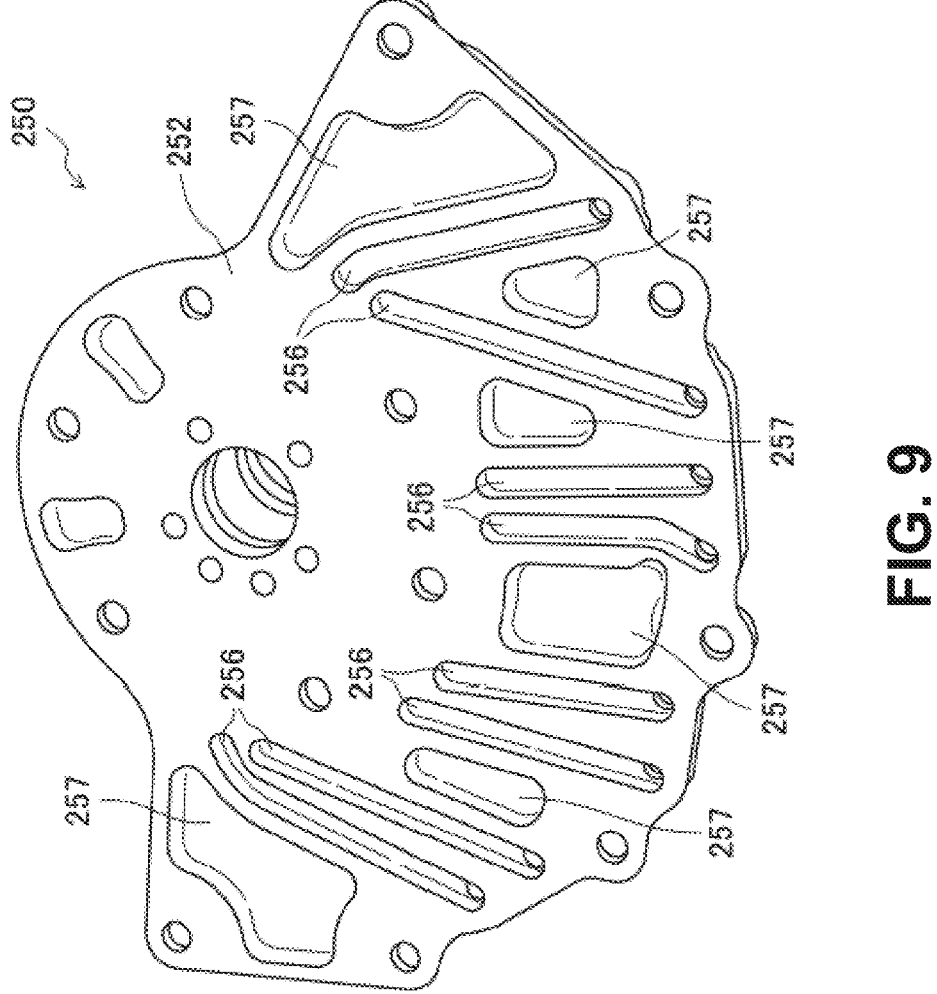
FIG. 9 is a perspective view showing an oil passage side of a cover according to Embodiment 2.

As shown in FIGS. 7 and 9, a second wall 251 is a wall constituted by a cover 250. A second rear surface 253 of the second wall 251 has a second recess 255 recessed forward in the axial direction, at a position in the radial direction at which the bolt 70 is located. The bolt head 71 of the bolt 70 is located in the second recess 255. In Embodiment 2, the third recess of Embodiment 1 is not provided.

A second groove 256 is formed in the second front surface 252. The second groove 256 extends in the radial direction. The depth direction of the second groove 256 coincides with the axial direction. The second groove 256 is provided only in a portion on the radial-direction outer side relative to the second recess 255 in the second front surface 252. The position of an end portion of the second groove 256 on the radial-direction inner side overlaps with the position of an end portion of the first inner groove 246b on the radial-direction outer side in the radial direction. The depth of the second groove 256 is about the same as the depth of the first inner groove 246b. The width of the second groove 256 is the same as the width of the first groove 246.

A plurality of (eight in this example) of second grooves 256 are provided corresponding to the first grooves 246. Each of the second grooves 256 has the same width. In the second front surface 252, a plurality of second auxiliary grooves 257 are provided in addition to the second grooves 56. The second auxiliary groove 257 is located at a position corresponding to the position of the first auxiliary groove 247. The second auxiliary groove 257 is a portion that forms the auxiliary space in cooperation with the first auxiliary groove 247. The second auxiliary groove 257 is deeper than the first auxiliary groove 247.

As shown in FIG. 7, a gasket 265 is disposed between the first rear surface 243 and the second front surface 252. The gasket 265 has a hole 265a formed in the overlapping portion between the second groove 256 and the first inner groove 246b. The gasket 265 does not have a hole at the position of the first outer groove 246a. Consequently, the first passage 261 is constituted by only the second groove 256 out of the first groove 246 and the second groove 256, and the second passage 262 of the oil passage 260 is constituted by only the first groove 246 out of the first groove 246 and the second groove 256.

In the oil passage 260, the second passage 262 is located on an axial-direction front side relative to the first passage 261. Since the depth of the second groove 256 is about the same as the depth of the first inner groove 246b, the cross-sectional area of the channel of the first passage 261 is about the same as the cross-sectional area of the channel of the second passage 262.

(5) Advantageous Effects of Embodiment 2

In Embodiment 2, in the oil passage structure for the automatic transmission 1 according to Embodiment 1, the first recess 245 recessed rearward in the axial direction is provided in the first front surface 242 of the first wall 41 at a position in the radial direction at which the resolver 14 is located, and the second recess 55 recessed forward in the axial direction is provided in the second rear surface 253 of the second wall 251 at a position in the radial direction at which the bolt head 71 is located. In the oil passage 260, the second passage 262 located at the position corresponding to the second recess 255 in the radial direction is located on the axial-direction front side relative to the first passage 261 located at the position corresponding to the first recess 245 in the radial direction. Consequently, in this way, the resolver 14 can be disposed closer to the second passage 262 while being spaced apart from the first passage 261 in the axial direction. On the other hand, the bolt head 71 can be disposed closer to the first passage 261 while being spaced apart from the second passage 262 in the axial direction. The oil passage structure enables a reduction in size in the axial direction while avoiding interference between the resolver 14 and the bolt head 71 and the oil passage 260, and can limit an increase in the size of the automatic transmission 1.

Moreover, in Embodiment 2, the first passage 261 is constituted by only the second groove 256 out of the first groove 246 and the second groove 256, and the second passage 262 is constituted by only the first groove 246 out of the first groove 246 and the second groove 256. Since the first recess 245 and the second recess 255 can be made as deep as possible, the resolver 14 can be placed as far rearward as possible in the axial direction, and the bolt head 71 can be placed as far forward as possible in the axial direction. Therefore, the oil passage structure can limit an increase in the size of the automatic transmission 1.

(6) Other Embodiment

The technology disclosed herein is not limited to the above-described embodiments, and substitutions are possible without departing from the spirit and scope of the claims.

For example, in Embodiments 1 and 2, the resolver 14 is disposed relatively outward in the radial direction, and the bolt 70 is located relatively inward in the radial direction. This is not a limitation, and the resolver 14 may be disposed relatively inward in the radial direction, and the bolt 70 may be disposed relatively outward in the radial direction. In this case, the second passages 62, 262 are located on the radial-direction outer side relative to the first passages 61, 261.

In Embodiments 1 and 2 described above, the first component is the resolver 14. The first component is not limited to this, and the first component may be a component other than the resolver, for example, the torque converter 10.

In Embodiments 1 and 2 described above, the second component is the bolt 70. The second component is not limited to this, and the second component may be a component other than the bolt, for example, the transmission mechanism 20.

In Embodiment 1 described above, the third recess 58 in which the bolt head 71 is disposed is provided. This is not a limitation, and the third recess 58 may not be provided in the structure of Embodiment 1. Even in this case, a portion of the bolt head 71 is disposed in the second recess 55.

In Embodiment 1 described above, the difference between the depth of the first outer groove 46a and the depth of the first inner groove 46b is the same as the difference between the depth of the second outer groove 56a and the depth of the second inner groove 56b. This is not a limitation, and the difference between the depth of the first outer groove 46a and the depth of the first inner groove 46b may be different from the difference between the depth of the second outer groove 56a and the depth of the second inner groove 56b as long as the difference is within a range that can adequately ensure the cross-sectional area of the channel of the oil passage 60. In other words, the cross-sectional area of the channel of the first passage 61 and the cross-sectional area of the channel of the second passage 62 may be clearly different.

The above-described embodiments are merely illustrative examples, and should not be interpreted as limiting the scope of the present disclosure. The scope of the present disclosure is defined by the claims, and all modifications and changes that fall within the scope of equivalents of the claims are within the scope of the present disclosure.

INDUSTRIAL APPLICABILITY

The technology disclosed herein is useful for an oil passage structure of an automatic transmission.

REFERENCE SIGNS LIST 1 automatic transmission
2 main shaft
14 resolver (first component)
20 transmission mechanism
30 motor
33 coil
40 motor housing (first member)
41 first wall
45 first recess
46 first groove
50 cover (second member)
51 second wall
55 second recess
56 second groove
58 third recess
60 oil passage
61 first passage
62 second passage
70 bolt (second component)
71 bolt head
240 motor housing (first member)
241 first wall
245 first recess
246 first groove
250 cover (second member)
251 second wall
255 second recess
256 second groove
260 oil passage
261 first passage
262 second passage

The invention claimed is:

1. An automatic transmission, comprising:
an oil passage structure including
   a first member including a first wall that extends in a radial direction of a main shaft of the automatic transmission;

a second member including a second wall that extends in the radial direction and is arranged to face the first wall from one side in an axial direction of the main shaft; and an oil passage constituted by a first groove formed on a surface of the first wall on the one side in the axial direction and extending in the radial direction, and a second groove formed on a surface of the second wall on another side in the axial direction and extending in the radial direction, wherein the first wall has a first recess on a surface on the other side in the axial direction, the first recess being recessed toward the one side in the axial direction, the second wall has a second recess on a surface on the one side in the axial direction, the second recess being located at a position different from the first recess in the radial direction and being recessed toward the other side in the axial direction, at least a portion of a first component is disposed in the first recess, at least a portion of a second component is disposed in the second recess, and in the oil passage, a second passage located at a position corresponding to the second recess in the radial direction is located on the other side in the axial direction relative to a first passage located at a position corresponding to the first recess in the radial direction.

2. The automatic transmission according to claim 1, wherein a depth of the first groove is shallower in the first passage than a depth of the first groove in the second passage, and a depth of the second groove is shallower in the second passage than a depth of the second groove in the first passage.

3. The automatic transmission according to claim 1, wherein the first passage is constituted by only the second groove out of the first groove and the second groove, and the second passage is constituted by only the first groove out of the first groove and the second groove.

4. The automatic transmission according to claim 3, wherein the first member is a motor housing that accommodates a motor, the first component is a rotation angle sensor, the motor is located on the other side in the axial direction relative to the first component, and a coil of the motor is located near the first component.

5. The automatic transmission according to claim 4, wherein a torque converter is disposed on a radial-direction inner side relative to the motor, the first recess is located on a radial-direction outer side relative to the second recess, and the first component measures a rotation angle of the torque converter and is located on the radial-direction outer side relative to the second component.

6. The automatic transmission according to claim 3, wherein the second component is a bolt that connects the first wall and the second wall, and at least a portion of a bolt head of the bolt is disposed in the second recess.

7. The automatic transmission according to claim 6, wherein

16 a third recess is located at a position of the bolt in the second recess, the third recess being recessed further toward the other side in the axial direction relative to another portion of the second recess, and the bolt head is disposed in the third recess.

8. The automatic transmission according to claim 7, wherein a transmission mechanism is disposed at a position that is on the one side in the axial direction relative to the second wall and near the second recess.

9. The automatic transmission according to claim 1, wherein the first member is a motor housing that accommodates a motor, the first component is a rotation angle sensor, the motor is located on the other side in the axial direction relative to the first component, and a coil of the motor is located near the first component.

10. The automatic transmission according to claim 2, wherein the first member is a motor housing that accommodates a motor, the first component is a rotation angle sensor, the motor is located on the other side in the axial direction relative to the first component, and a coil of the motor is located near the first component.

11. The automatic transmission according to claim 1, wherein the second component is a bolt that connects the first wall and the second wall, and at least a portion of a bolt head of the bolt is disposed in the second recess.

12. The automatic transmission according to claim 2, wherein the second component is a bolt that connects the first wall and the second wall, and at least a portion of a bolt head of the bolt is disposed in the second recess.

13. The automatic transmission according to claim 4, wherein the second component is a bolt that connects the first wall and the second wall, and at least a portion of a bolt head of the bolt is disposed in the second recess.

14. The automatic transmission according to claim 9, wherein the second component is a bolt that connects the first wall and the second wall, and at least a portion of a bolt head of the bolt is disposed in the second recess.

15. The automatic transmission according to claim 10, wherein the second component is a bolt that connects the first wall and the second wall, and at least a portion of a bolt head of the bolt is disposed in the second recess.

16. The automatic transmission according to claim 1, wherein the second recess is located on a radial-direction inner side relative to the first recess.

17. The automatic transmission according to claim 1, wherein the first recess overlaps with the second groove in the axial direction.

18. The automatic transmission according to claim 1, wherein the second recess overlaps with the first groove in the axial direction.

19. The automatic transmission according to claim 17, wherein the second recess overlaps with the first groove in the axial direction.

* * * * *